A. D. NEY.
ROCK LIKE SUBSTANCE.
APPLICATION FILED JULY 10, 1909.
939,072.  Patented Nov. 2, 1909.
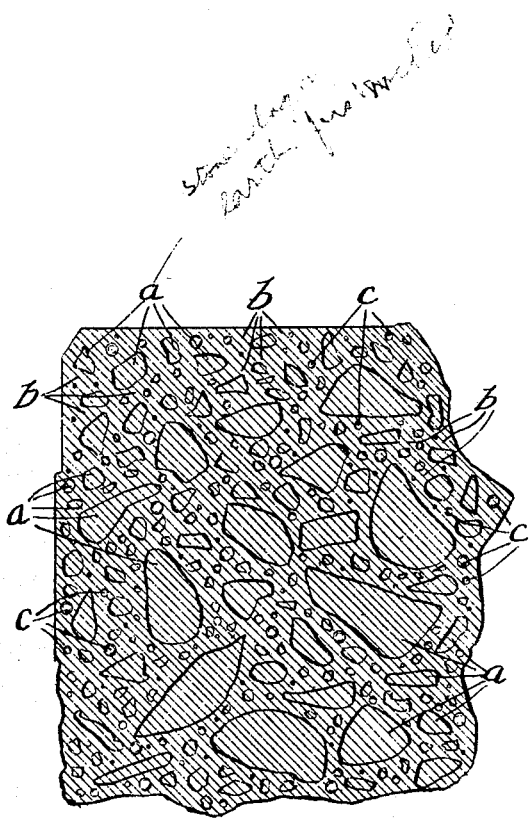
Witnesses:
Inventor:
Alexander D. Ney
by Banning & Banning
Attys

UNITED STATES PATENT OFFICE.

ALEXANDER D. NEY, OF AURORA, ILLINOIS.

ROCK-LIKE SUBSTANCE.

939,072. Specification of Letters Patent. Patented Nov. 2, 1909.

Application filed July 10, 1909. Serial No. 506,980.

*To all whom it may concern:*

Be it known that I, ALEXANDER D. NEY, a citizen of the United States, residing at Aurora, in the county of Kane and State of Illinois, have invented certain new and useful Improvements in Rock-Like Substances, of which the following is a specification.

The object of the present invention is to produce a relatively hard, compact, and solid rock-like substance, composed, in part, of earthy materials, such as stones, pieces of rock, slag, pieces of brick, or similar natural or artificial mineral products, and, in part, of cement, which serves to unite the earthy materials into a solid mass.

In the making of concrete, it has hitherto been the general practice, in mixing the materials, to make the mass as stiff as possible, using only sufficient water to cause adherence of the materials together, and thereafter tamping the materials to cause the mass to be as compact as possible in its relatively dry condition.

In the operation of making the product of the present invention, a radically different method is followed in that an abundance of water is employed in order not only to permit gravity to bring the mass to a solid, compact condition, and thereby dispense with the ramming operation, but also to provide sufficient water for the purposes of crystallization. The process of forming the present product is essentially a wet process as distinguished from the relatively dry process employed in making concrete.

The drawing shows a piece of the present product, broken through the mass to illustrate the various ingredients employed and the character of the completed mass.

In carrying out the present process I employ particles *a* of stone, slag or other earthy material, which should be cleansed from vegetable substances, dirt or filth and are preferably graduated is size from the largest particles the work will permit, down to particles which are substantially the sizes of the particles of cement. These particles of earthy material should be used in a moist condition, since such particles will absorb a greater or less amount of water; and it is highly desirable that the water absorbed into the particles of earthy material be not withdrawn from the water stored up in the cement, and which is necessary for purposes of crystallization. The stone, slag or other earthy material should preferably be used in sufficient quantity to form the bulk of the mass, so that the cement will serve to unite the seams, but need not be used as a filler for large spaces or cavities, which would be an expensive way of combining the materials composing the mass. Furthermore, it is desirable to use a minimum quantity of cement in order to conserve the available quantity of water for purposes of crystallization. A sufficient amount of cement *b* should be used to thoroughly cement the seamage of the mass, the earthy particles being relied upon to give the necessary bulk to the mass. A sufficient quantity of water should be used in the mixture to cause it to liquidate sufficiently to allow gravity to bring the material to a solid mass, having within its body and stored in cells or cavities a reserve supply of water which will be drawn upon to assist in the crystallization of the materials. When the above mass of materials is thoroughly mixed, it should be stirred in a mixing manner within the form, to cause the material to thoroughly fill the form and take on the shape of the form.

During the mixing operation, the cement will be evenly and thoroughly spread over the surface of the stone, slag or other earthy particles of material, so that the cement will be in position to unite in a satisfactory manner with all the exposed surface of the particles of earthy material. If a sufficient quantity of water has been used in the mixing of the materials, a layer of water will be present on the surface of the materials after the mixing operation, and the mixing should be continued in the form so long as any air bubbles appear on the surface of the water, which air bubbles indicate the presence of air voids in the body of the mass of fresh material, which should be eliminated before the initial crystallization of the mass. During the progress of crystallization, the layer of water on the top of the mass will gradually disappear, uniting with the cement in the crystallizing action.

After the mass has normally crystallized, which takes place during about thirty days or more, it will, when broken, cleave through the particles of rock or other earthy material, indicating that the entire mass is of substantially equal strength, where stone, slag or other similar earthy material of ordinary strength is used. An inspection of the broken surface will show that the particles of earthy material are entirely and completely embedded in and surrounded by the cement, so that practically no air holes or interstices will be present, save only that the mass will be interspersed with small cells or cavities c having a smooth rounded surface, which cells or cavities indicate the spaces from which water has been drawn by crystallization.

The product of the present invention differs from certain prior products, by reason of the presence of such cells or cavities, which would be lacking if the mass were subjected to a pressure tending to expel the water prior to the crystallization. The water being lighter than the other bodies of materials used in the mass, a pressure caused by tamping or ramming would bring the water to the top of the material and destroy the uniform position of the cells in which the reserve supply of water is held. The product of the present invention is superior to ordinary tamped concrete, in strength, uniformity, hardness and durability, and more impervious to the penetration of water. Furthermore, by dispensing with the tamping or ramming process, the present product can be produced more quickly and easily, and will more perfectly shape itself to the intended form.

The product of the present invention is especially adapted for use in forming the lower or ground layer of sidewalks, and for general construction.

I claim:

1. A rock-like substance, composed, in part, of particles of earthy material, and having the seams intermediate such particles filled with crystallized cement, the mass having therein cells or cavities formed by the withdrawal of water by crystallization, substantially as described.

2. A rock-like substance, composed, in part, of particles of earthy material of graduated sizes, and having the seams intermediate such particles filled with crystallized cement, the mass having therein cells or cavities formed by the withdrawal of water by crystallization, substantially as described.

3. A rock-like substance, composed, in part, of particles of earthy material of graduated sizes, proportionate from the largest particle the work will permit down to the size of the particles of cement used, and having the seams intermediate such particles filled with crystallized cement, the mass having therein cells or cavities formed by the withdrawal of water by crystallization, substantially as described.

4. A rock-like substance, composed, in part, of particles of earthy material, completely coated with crystallized cement to unite the seamage between the particles, and the mass having therein cells or cavities formed by the withdrawal of water by crystallization, substantially as described.

5. A rock-like substance, composed, in part, of particles of earthy material of graduated sizes, completely coated with crystallized cement to unite the seamage between the particles, and the mass having therein cells or cavities formed by the withdrawal of water by crystallization, substantially as described.

6. A rock-like substance, composed, in part, of particles of earthy material of graduated sizes, proportionate from the largest particle the work will permit down to the size of the particles of the cement used, completely coated with crystallized cement to unite the seamage between the particles, and the mass having therein cells or cavities formed by the withdrawal of water by crystallization, substantially as described.

7. A rock-like substance, composed, in part, of particles of earthy material, completely coated with crystallized cement to unite the seamage between the particles, and the mass having the air voids eliminated by stirring in a mixing manner, and having therein cells or cavities formed by the withdrawal of water by crystallization, substantially as described.

ALEXANDER D. NEY.

Witnesses:
FRANCES M. FROST,
SAMUEL W. BANNING.